A. HAGQUIST.
LAWN MOWER.
APPLICATION FILED FEB. 17, 1916.
1,201,721.
Patented Oct. 17, 1916.
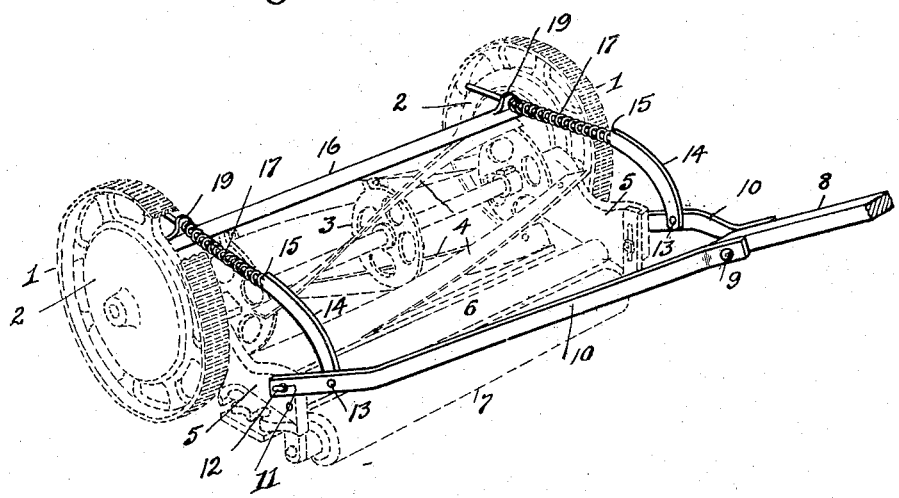
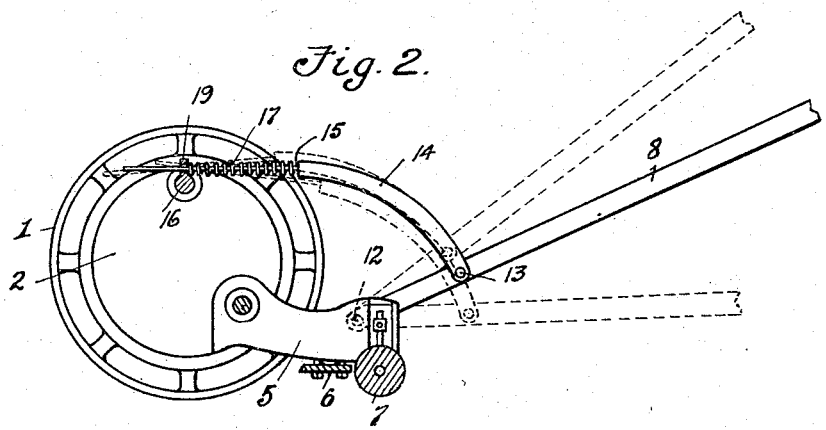
INVENTOR
Andrew Hagquist.
BY
George J. Ottsch
ATTORNEY

UNITED STATES PATENT OFFICE.

ANDREW HAGQUIST, OF SOUTH BEND, INDIANA.

LAWN-MOWER.

1,201,721. Specification of Letters Patent. Patented Oct. 17, 1916.

Application filed February 17, 1916. Serial No. 78,823.

*To all whom it may concern:*

Be it known that I, ANDREW HAGQUIST, a citizen of the United States, residing at South Bend, in the county of St. Joseph and State of Indiana, have invented certain new and useful Improvements in Lawn-Mowers, of which the following is a specification.

The present invention relates to improvements in lawn mowers, and more particularly to the means for propelling or operating the same.

The object of the invention resides in the provision of an improved handle and its connections with the frame of a lawn mower, whereby to facilitate and render the operation thereof under varying conditions with more ease and less expenditure of applied power. With this object in view I provide a lawn mower of the general type illustrated in the accompanying drawing, with a handle and its connections applied in such a manner that the applied power in manually pushing the same is distributed to the frame of the mower at widely separated points, and at points both above and below the horizontal center of the mower, without regard to the angle of the handle with relation to the mower, whereby the handle may have a wide range of angular adjustment and the mower operated in consequence with ease over undulating ground and on the steep grades of terraced lawns.

A further object resides in the provision of a handle for lawn mowers, whereby the mower may be operated with the position of the handle parallel with or on an angle downwardly of the surface of the lawn, whereby a steep terrace bank may be mowed to the extent of the reach of the operator from the top of the bank without the difficulties met with in the use of the ordinary handles of more limited adjustment.

The invention in the preferred form of details will be described in the following specification, reference being had particularly to the accompanying drawings, in which:

Figure 1 is a perspective view of a lawn mower shown in dotted lines, with the embodiment of the invention shown in full lines. Fig. 2 is a longitudinal central sectional view of a lawn mower frame showing the application of the invention.

The structure of the lawn mower may be of any well known or suitable type and adapted for manual operation, and such usually comprise a pair of drive wheels 1, suitably mounted for rotation upon the forward portions of the frame forming the gear housings, as at 2, which drive wheels through gears (not shown) mounted in said housings have connections with the reel 3, carrying the cutting blades 4, the reel being revolved at a high rate of speed through such connections with the drive wheels, all in the manner as is well known in the art. Comprising a part of the frame are rearwardly extending brackets 5, between which are mounted the stationary blade 6 for coöperation with the revolving blades of the reel, and an adjustable roller 7 for regulating the height of the reel with relation to the ground, whereby a uniform and desired height of stand of the grass may be obtained in the operation of the mower, all as is well understood in the art.

The means for applying the manual power for pushing the mower over the ground, and which constitutes the gist of my invention, consists of a handle 8 of suitable material, preferably of wood, and the outer or free end of which may be formed in a manner to provide a suitable hand grip (not shown) of any desired formation. Secured to the inner end of the handle, as by means of a bolt 9, and to the opposing side edges thereof, are diverging metal bars 10 forming in effect a forked end for the handle. The ends of the bars are provided with apertures 11 to receive pivot lugs 12 formed on the outer side surfaces of the brackets 5 of the frame, the pivot connections being such as to permit the handle to have an unlimited movement thereon.

Pivotally attached to the bars 8, as by bolts 13, are curved arms 14, the free ends of which are reduced, preferably round in cross section, and forming shoulders 15 for a purpose presently explained. Integrally formed on the upper side of a brace rod 16 connecting the opposing gear housings 2 constituting a part of the mower frame, are apertured lugs 19, through which the free ends of the arms 14 extend with freedom of endwise movement through said apertures under varying directions of movement of the arms as controlled by the raising or lowering of the handle, as plainly indicated by dotted lines in Fig. 2. Interposed between the lugs on the brace rod and the shoulders of the arms and encircling the reduced portions of the arms are coiled expansion springs 17, the function of which is to apply a pushing force to the upper part of the frame at all times regardless of the position of the handle, so that the force applied through the handle in operating the mower will be directed to both the upper and lower parts of the frame of the mower, thus making for ease of operation regardless of the angularity of the handle with relation to the machine proper, and renders it possible to mow the grass on a steep terrace without difficulty, owing to the fact that neither the drive wheels nor the reel can be raised off of the ground by any limitation of movement of the handle.

While the foregoing describes the preferred form of my invention, I desire it to be understood that I do not limit myself to the precise structure shown and described, as it is obvious that the same may be variously modified without departing from the spirit of the invention.

What is claimed is:

1. The combination with a lawn mower and its frame, of an operating handle having pivotal connection with the frame, and auxiliary means connecting said handle and the frame adapted to exert a forward pushing force against the frame for all positions of the handle.

2. The combination with a lawn mower and its frame, of an operating handle having pivotal connection with the lower portion of the frame, and expansive means connecting the handle with the upper frame portion and adapted to exert a forward pushing force thereto under control of the handle movement.

3. The combination with a lawn mower and its frame, of an operating handle having pivotal connection with the lower portion of the frame, members carried by the handle having a sliding connection with the upper frame portion, and springs carried by said members and adapted to exert a pushing force against the upper frame portion for all positions of the handle.

4. The combination with a lawn mower and its frame, of a handle having diverging members pivotally connected at their ends to the opposing sides of the lower frame portion, arms pivotally connected to the diverging members and having a sliding engagement with the upper frame portion, and springs carried by said arms limited in movement in the direction of the pivoted ends of the arms and free to expand in the opposite direction engaging the upper frame portion.

5. The combination with a lawn mower and its frame, of a transverse brace rod connecting the opposing inner sides of the upper frame portion, apertured lugs on said brace rod, a bifurcated handle pivotally connected to the sides of the opposing lower frame portions, shouldered arms pivotally connected with the bifurcated portions of the handle having their free ends extending through said apertured lugs for sliding engagement therewith, and coiled expansion springs encircling said arms and disposed between the shouldered portions thereof and the said lugs.

In testimony whereof I affix my signature in presence of two witnesses.

ANDREW HAGQUIST.

Witnesses:
L. M. HAMMERSCHMIDT,
GEORGE J. OLTSCH.